United States Patent [19]

Foy et al.

[11] 4,115,475
[45] Sep. 19, 1978

[54] METHOD TO PREPARE COPOLYESTERAMIDES FOR MOULDING

[75] Inventors: Paul Foy, Paris; René Kern, Savigny-sur-Orge, both of France

[73] Assignee: Ato Chimie, Courbevoie, France

[21] Appl. No.: 704,815

[22] Filed: Jul. 13, 1976

[30] Foreign Application Priority Data

Jul. 17, 1975 [FR] France .............................. 75 22365

[51] Int. Cl.$^2$ .............................................. C08L 77/00
[52] U.S. Cl. ...................... 260/857 PE; 260/857 TW
[58] Field of Search ................... 260/857 TW, 857 PE

[56] References Cited

U.S. PATENT DOCUMENTS

| 3,493,632 | 2/1970  | Okazaki    | 260/857 PE |
| 3,632,666 | 1/1972  | Okazaki    | 260/857 PE |
| 3,636,135 | 1/1972  | Garforth   | 260/857 PE |
| 3,639,502 | 2/1972  | Okazaki    | 260/857 PE |
| 3,839,245 | 10/1974 | Schlossman | 260/857 PE |
| 3,849,514 | 11/1974 | Gray       | 260/857 PE |
| 3,855,350 | 12/1974 | Oldham     | 260/857 TW |

FOREIGN PATENT DOCUMENTS

| 2,307,834 | 5/1976 | France. |            |
| 43-3,018  | 3/1968 | Japan   | 260/857 PE |
| 44-18,931 | 8/1969 | Japan   | 260/857 PE |

OTHER PUBLICATIONS

Derwent Abstract for Belgium 840,709, 4/15/75.

Primary Examiner—Paul Lieberman
Attorney, Agent, or Firm—Burgess, Ryan and Wayne

[57] ABSTRACT

A process for synthesizing sequence copolyesteramides with the general formula $$OH[CO-A-COO-B-O]_n H$$

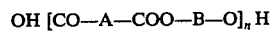

where A is a linear aliphatic polyamide sequence and B is a linear aliphatic copolyesteramide sequence, for use in producing moulded or extruded articles with good mechanical resistance at elevated temperature; the process consists of polycondensation of a linear aliphatic copolyesteramide with hydroxyl end-groups, with a molecular weight of between 1,000 and 10,000, and a polyamide with carboxyl end-groups, with a molecular weight of between 2,000 and 15,000.

11 Claims, No Drawings

METHOD TO PREPARE COPOLYESTERAMIDES FOR MOULDING

This invention concerns a process for synthesizing sequence copolyesteramides having the general formula OH[CO—A—COO—B—O ]$_n$ H where A is a linear aliphatic polyamide sequence and B is a linear aliphatic copolyesteramide sequence, possessing suitable mechanical properties for the production of moulded or extruded rigid or semi-rigid articles.

When a copolyesteramide is obtained directly, either from raw materials (amino-acids or lactams or diamines with diacids and dialcohols), or from a polycondensate reacting with one or more monomers, the resulting products are unsuitable for use in manufacturing non-elastomeric moulded articles.

Sequence polyesteramides possessing mechanical properties suitable for manufacture of shockproof semi-rigid thermoplastic articles can be obtained by reaction, in convenient proportions, between a dicarboxylic linear polyamide and a dihydroxylated linear polyester.

However, synthesis of such products as described in French Patent Application n° 75 11606 of Apr. 15, 1975, involves certain drawbacks.

When the polyamide is mixed with the polyester, the two phases will not mix on melting, and this non-miscibility disappears only slowly as the polycondensation reaction progresses. Consequently, the reaction takes quite a long time.

Furthermore, to facilitate the polyamide-polyester reaction, the molecular weight of initial sequences must not exceed 10,000 for polyamide and 6,000 for polyester, since the longer the sequences, the longer it will take for the phases to mix, making the polycondensation reaction all the more difficult to obtain.

It is also difficult to obtain products with a Vicat point between 140° and 200° C., and the torsional rigidity modulus G, measured by the Clash and Berg method, is usually less than 2,000 kg/cm2 at 20° C.

The instant invention overcomes these drawbacks, providing products with better mechanical resistance under elevated temperature conditions.

The process consists of polycondensation of a copolyesteramide with hydroxyl end-groups, with a molecular weight of between 1,000 and 10,000, and a polyamide with carboxyl end-groups, with a molecular weight of between 2,000 and 15,000, in order to obtain sequence copolyesteramides for moulding or extruding, possessing a Vicat point of above 140° C. and a torsional rigidity modulus G of between 500 and 4,000 kg/cm2 at 20° C.

There are many advantages in using a dihydroxylated copolyesteramide instead of polyester with a dicarboxylated polyamide, for synthesis of a sequence product.

With a copolyesteramide, for example, molten miscibility of phases occurs far sooner, so that polycondensation is much faster.

This faster miscibility also allows polyamide and copolyesteramide sequences with higher molecular weights to be used: 1,000 to 10,000, and preferably 3,000 to 9,000, for copolyesteramide, and 2,000 to 15,000, and preferably 4,000 to 12,000, for polyamide.

Another advantage of this process is that products obtained under comparable experimental conditions, using a copolyesteramide sequence instead of a polyester, possess better heat resistance. With dihydroxylated copolyesteramide sequences, a Vicat point of 150° to 200° C. can be obtained easily, whereas with dihydroxylated polyester sequences it is very difficult to obtain a Vicat point of more than 140° C.

The dihydroxylated copolyesteramide is a polyester-type sequence containing a minority of amide groups in the chain and with hydroxyl end-groups. It can be obtained directly from monomers.

Copolycondensation of this copolyesteramide and a dicarboxylic polyamide produces a sequence product with suitable mechanical properties for the manufacture of moulded or extruded articles.

The copolyesteramide with hydroxyl end-groups used in the reaction is obtained by simultaneous reaction between monomers normally used in synthesis of dicarboxyl polyamide and dihydroxyl polyester, amino acid or lactam or linear α-ω diamine and an α-ω diacid and an α-ω diol, with an excess amount of diol in relation to the stoichiometry of the functional groups, in order to ensure the formation of hydroxyl end-groups.

Suitable monomers include lactams such as caprolactam, oenantholactam, decalactam, undecanolactam, dodecalactam; amino acids, such as 6-amino-caproic and 11-amino-undecanoic acid; aliphatic linear diamines such as hexamethylene diamine, nonamethylene diamine, dodecamethylene diamine; dicarboxylic aliphatic linear α-ω diacids, such as succinic, glutamic, adipic, pimelic, suberic, azelaic, sebacic and dodecanedioic diacids, aliphatic α-ω diols, such as ethylene glycol, propylene glycol, 1-4 butane diol, 1-6 hexane diol, 1-10 decane diol.

This copolyesteramide with hydroxyl end-groups is obtained by heating the mixture of monomers in an inert gas until it melts, usually at a temperature of about 200° C. The catalyst is then added and heating continues for 2 to 3 hours, after which the temperature is raised by several tens of degrees in a vacuum of 0.5 to 2 mm Hg, to eliminate excess diol.

This copolyesteramide can be used directly with dicarboxylic polyamide in the polycondensation reaction, and it usually contains enough catalyst for this polycondensation reaction (if not, enough extra catalyst can be added to obtain suitable reaction conditions).

The initial copolyesteramide, obtained from monomers, should contain approximately 50% weight of polyamide ingredients in relation to polyester and preferably a slight excess of polyester groups, as related to the polyamide groups.

The proportions of the two sequences are combined to ensure a slight excess amount of hydroxyl groups.

The dicarboxylic polyamide sequence is obtained either by polymerizing lactam, or by polycondensing an α-ω amino acid or diacid and diamine salt, in the presence of between 0.5 and 5% linear aliphatic diacid in relation to the weight of carboxylic groups.

The final sequence product contains not less than 60% weight of polyamide groups.

The temperature of the copolyesteramide/dicarboxylic polyamide polycondensation reaction is generally between 200° and 300° C. The duration of the reaction depends mainly on the volume of mixture: the larger the volume, the longer the duration of the reaction will be, under similar conditions. 0.5 to 1 liter of mixture will require between 30 minutes and 4 hours, and preferably between 1 and 2 hours.

A transesterification catalyst is used, such as an alkyl titanate, zinc acetate, antimony trioxide or lead oxide;

the amount used is 1 × 10⁻⁴ to 2% and preferably 5 × 10⁻⁴ to 3 × 10⁻³ of the total mass.

Polycondensation takes place in a high vacuum, usually about 0.1 to 5 mm Hg.

Testing and identification measurements for products are as follows:
melting point, measured by differential thermal analysis;
Vicant point in ° C., expressed according to ASTM standard D 1525 65 T;
inherent viscosity, measured in metacresol at 25° C. with a concentration of 0.5 g per 100 ml;
tensile elongation, measured according to ASTM standard D 638 72;
torsional rigidity modulus G, measured according to ASTM standard D 1043 61 T, using the Clash and Berg method.

The invention is illustrated by the following examples, without being confined to the same.

EXAMPLE 1

Preparation of copolyesteramide with hydroxyl end-groups 274 g 11-aminoundecanoic acid, 216 g adipic acid and 180 g ethylene glycol were placed in a 1-liter reactor fitted with an agitator system, thermometer, vacuum outlet and gas inlet.

The mixture was heated until molten in a nitrogen atmosphere. 0.6 ml tetraisopropyltitanate was added, and the temperature raised to 195° C. for 3 hours, with the agitator in operation, at atmospheric pressure and in a nitrogen atmosphere. The temperature was then raised to 220° C. in a 1 mm Hg vacuum for 2½ hours, to help the polycondensation reaction and eliminate excess ethylene glycol. The reaction produced a polymer with hydroxyl end-groups, and with a molecular weight of 5,400.

Preparation ofسequence copolyesteramide 86.2 g copolyesteramide with hydroxyl end-groups, produced as described above, and 113.8 g 11-dicarboxylic polyamide with a molecular weight of 7,270, obtained by reaction at 240° C. for 3 hours in a nitrogen atmosphere between 11-aminoundecanoic acid and 1.86% of its weight of adipic acid, in a ½-liter reactor fitted with an agitator system, gas inlet and vacuum outlet.

The mixture was heated while being stirred for 2 hours in a 1 mm Hg vacuum.

The resulting sequence copolyesteramide had the following properties :
inherent viscosity 0.98;
melting point 175° C.

Polyamide sequences with an average molecular weight of 3,000 were recovered by dissolving 5 g unprocessed polymer in concentrated sulphuric acid and by precipitation at low temperature in water.

Mechanical tests were carried out on test-pieces 2 mm thick and 50 mm long in the narrow section, obtained by processing the sequence polyesteramide through a Brabender extruder, followed by injection at a pressure of 525 kg/cm2 at 190° C. in an Arburg piston-screw press.

Flow-point elongation was 12% at 130 kg/cm2, and breaking elongation was 415% at 295 kg/cm2.

The torsional rigidity modulus G, measured by the Clash and Berg method, was 1,110 kg/cm2 at 22° C.

The Vicat point was 149° C.

EXAMPLE 2

This example is given for comparison with example 1, to show that if a polyester with hydroxyl end-groups is used instead of a copolyesteramide, reaction time is longer and heat resistance of the product less satisfactory.

150 g 11-dicarboxylic polyamide with a molecular weight of 5,000, 52 g ethylene glycol polyadipate with hydroxyl end-groups, with a molecular weight of 1,700, were placed in a ½-liter balloon-flask.

The mixture was heated until molten in a nitrogen atmosphere. 0.2 ml tetraisopropylorthotitanate was added, and the temperature raised to 260° C., with the stirring system in operation, in a 1 mm Hg vacuum. These conditions were maintained for 4 hours.

The product had the following properties :
inherent viscosity 1
melting point 160° C.
Vicat point 130° C.

Compared with the results in example 1, melting and Vicat points are reduced.

EXAMPLE 3

Preparation of copolyesteramide with hydroxyl end-groups

Using the same method as described in example 1, 289.8 g hexamethylene diamine adipate, 180.2 g ethylene glycol and 213.2 g adipic acid were polycondensed in the presence of 0.6 ml isopropylorthotitanate.

This produced a polycondensate with hydroxyl end-groups, with a molecular weight of 5,500. 100 g of this polyesteramide and 100 g 12-dicarboxylic polyamide with a molecular weight of 5,500 were heated to 260° C. for 90 minutes in a 1 mm Hg vacuum.

The resulting polyesteramide had the following properties :
inherent viscosity 1.05
melting point 175° C.

The following results were obtained for mechanical tests, performed on test-pieces produced as described in example 1:
Vicat point 146° C.
flow-point elongation 11% at 129 kg/cm2
breaking elongation 473% at 310 kg/cm2
torsional rigidity modulus G 945 kg/cm2 at 23° C.

EXAMPLE 4

A polyesteramide with hydroxyl end-groups was prepared as in example 1, by the reaction of 219 g 11-amino-undecanoic acid, 254 adipic acid and 216 g ethylene glycol, in the presence of 0.6 ml isopropyl tetraorthotitanate at 185° C. in a nitrogen atmosphere for 3 hours.

The temperature was then raised to 220° C. in a 1 mm Hg vacuum, to remove excess ethylene glycol. This produced a polyesteramide with hydroxyl end-groups, with an average molecular weight of 3,290.

A polyamide with carboxyl end-groups was prepared by reaction between 8,000 g hexamethylenediamine adipate and 26.2 g adipic acid, at 285° C. for 3 hours in a nitrogen atmosphere. This produced a 6-6 polyamide with carboxyl end-groups, with an average molecular weight of 4,000.

109.6 g of this dicarboxylic polyamide and 90.3 g of this polyesteramide were mixed in a ½-liter reactor, and heated while being stirred, for 2 hours in a 1 mm Hg vacuum.

The resulting copolyesteramide had the following properties:
inherent viscosity 0.93
Vicat point 186° C.
flow-point elongation 11% at 162 kg/cm2
breaking elongation 275% at 200 kg/cm2
torsional rigidity modulus G 1,555 kg/cm2 at 22° C.

EXAMPLE 5

The method described in example 4 was used to prepare a 6-6 dicarboxylic polyamide with a molecular weight of 3,000.

A polyesteramide with hydroxyl end-groups, with an average molecular weight of 5,100, was also prepared from hexamethylenediamine adipate, ethylene glycol and adipic acid, using the methods described in examples 1 and 3.

As in example 1, 126 g hydroxylated polyesteramide was mixed with 74 g dicarboxylic polyamide, and heated to 260° C. for 1½ hours.

The weight ratio of polyamide to polyester sequences in the resulting copolyesteramide was 56 to 44. Inherent viscosity was 0.96 and the melting point 205° C.

The following results were obtained for mechanical tests, performed on test-pieces produced as described in example 1:
Vicat point 159° C.
flow-point elongation 11% at 170 kg/cm2
breaking elongation 295% at 184 kg/cm2
torsional rigidity modulus G 1,400 at 23° C.

EXAMPLE 6

Using the method described in example 1, 79 g 6-6 dicarboxylic polyamide, with an average molecular weight of 3,690, was mixed with 104 g polyesteramide with hydroxyl end-groups, and with an average molecular weight of 4,800, obtained by polycondensation of a mixture of hexamethylene diamine adipate, adipic acid and ethylene glycol, in the presence of 0.4 ml tetraisopropylorthotitanate.

The mixture was heated to 265° C. while being stirred, in a 1 mm Hg vacuum for 2 hours. The weight ratio of polyamide to polyester sequences in the resulting sequence copolyesteramide was 59/41. Inherent viscosity was 0.91 and the melting point 180° C.

Mechanical tests gave the following results:
Vicat point 148° C.
flow-point elongation 11% at 109 kg/cm$^2$
breaking elongation 630% at 315 kg/cm$^2$
torsional rigidity modulus G 980 kg/cm$^2$ at 20° C.

Following the procedure described above except for the replacement of the tetraisopropylorthotitanate catalyst by tetrabutylorthotitanate, substantially similar results were obtained.

What is claimed is:

1. A process for synthesizing sequence linear aliphatic copolyesteramides having not less than 60% by weight polyamide groups for use in making rigid or semi-rigid moulded or extruded articles with a Vicat point higher than 140° C. and a torsional rigidity modulus G, measured by the Clash and Berg method, of 500 to 4,000 kg/cm2 at 20° C., said process comprising reacting a linear aliphatic copolyesteramide with hydroxyl end-groups, with a molecular weight of 1,000 to 10,000, and containing about 50% polyamide groups, with a linear aliphatic polyamide with carboxyl end-groups, having a molecular weight of 2,000 to 15,000, at temperatures of 200° to 300° C., in an 0.1 to 2 mm Hg vacuum, and in the presence of $1 \times 10^{-4}$ to 2% weight of an esterification catalyst.

2. The process of claim 1 wherein said copolyesteramide with hydroxyl end-groups has a molecular weight of 3,000–9,000 and said linear aliphatic polyamide with carboxyl end-groups has a molecular weight of 4,000–12,000 and wherein said esterification catalyst is present at from about $5 \times 10^{-4}$ to about $3 \times 10^{-3}$% by weight.

3. The process of claim 1 wherein said linear aliphatic copolyesteramide with hydroxyl end-groups is produced by direct polycondensation of monomers in the presence of a slight excess of $\alpha$-$\omega$diol.

4. The process of claim 2 wherein said linear aliphatic copolyesteramide with hydroxyl end-groups is produced by direct polycondensation of monomers in the presence of a slight excess of $\alpha$-$\omega$diol.

5. The process of claim 1 wherein said esterification catalyst is a tetra-alkyl orthotitanate.

6. The process of claim 2 wherein said esterification catalyst is a tetra-alkyl orthotitanate.

7. The process of claim 5 wherein said catalyst is tetraisopropylorthotitanate.

8. The process of claim 6 wherein said catalyst is tetraisopropylorthotitanate.

9. The process of claim 5 wherein said catalyst is tetrabutylorthotitanate.

10. The process of claim 6 wherein said catalyst is tetrabutylorthotitanate.

11. The copolyesteramide obtained by the process of claim 1.

* * * * *

UNITED STATES PATENT OFFICE
CERTIFICATE OF CORRECTION

Patent No. 4,115,475  Dated September 19, 1978

Inventor(s) Paul Foy, et al

It is certified that error appears in the above-identified patent and that said Letters Patent are hereby corrected as shown below:

Column 3, line 8: replace "Vicant" by --Vicat--.

Signed and Sealed this

Twentieth Day of February 1979

[SEAL]

Attest:

RUTH C. MASON
Attesting Officer

DONALD W. BANNER
Commissioner of Patents and Trademarks